US008489840B2

(12) United States Patent
Schneider

(10) Patent No.: US 8,489,840 B2
(45) Date of Patent: Jul. 16, 2013

(54) DISCONTIGUOUS OBJECT ADDRESSING

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1169 days.

(21) Appl. No.: 12/393,993

(22) Filed: Feb. 26, 2009

(65) Prior Publication Data

US 2010/0217947 A1    Aug. 26, 2010

(51) Int. Cl.
*G06F 12/02*    (2006.01)
(52) U.S. Cl.
CPC ................................. *G06F 12/0253* (2013.01)
USPC .................... 711/170; 707/813; 711/E12.009
(58) Field of Classification Search
None
See application file for complete search history.

(56) References Cited

U.S. PATENT DOCUMENTS

| | | | |
|---|---|---|---|
| 6,862,729 B1* | 3/2005 | Kuch et al. | 717/158 |
| 2002/0087563 A1* | 7/2002 | Ghemawat et al. | 707/100 |
| 2004/0215880 A1* | 10/2004 | Chilimbi et al. | 711/118 |
| 2005/0149346 A1* | 7/2005 | Arnold et al. | 705/1 |
| 2008/0034355 A1* | 2/2008 | Shen et al. | 717/148 |
| 2009/0199169 A1* | 8/2009 | Lin | 717/159 |

OTHER PUBLICATIONS

Michael Franz and Thomas Kistler. "Splitting Data Objects to Increase Cache Utilization." Oct. 1998. Department of Information and Computer Science, University of California, Irvine. TR No. 98-34.*
Jesse Liberty. Sams Teach Yourself C++ in 24 Hours. Aug. 2001. Sams Publishing. 3$^{rd}$ ed. pp. 136-138.*
Sun Microsystems. Java Dynamic Management Kit 5.0 Tutorial. Jun. 2002. Sun Microsystems. pp. 42-44.*
Rodric M. Rabbah and Krishna V. Palem. "Data Remapping for Design Space Optimization of Embedded Memory Spaces." May 2003. ACM. ACM Transactions on Embedded Computing SYstems. vol. 2. pp. 186-218.*
Xianglong Huang. "The Garbage Collection Advantage: Improving Program Locality." Oct. 2004. ACM. OOPSLA '04. pp. 69-80.*
Robert Hundt et al. "Practical Structure Layout Optimization and Advice." Mar. 2006. IEEE. CGO '06.*
Chen, W., et al., "Profile-guided Proactive Garbage Collection for Locality Optimization", PLDI '06, Jun. 11-14, 2006, Ottawa, Canada, 10 pages.

* cited by examiner

*Primary Examiner* — Nathan Sadler
(74) *Attorney, Agent, or Firm* — Lowenstein Sandler LLP

(57) ABSTRACT

Some embodiments of discontiguous object addressing have been presented. In one embodiment, a set of objects, each having one or more properties, are stored in a memory of a computer system. The memory is divided into chunks. The properties of at least one of the objects are stored in discontiguous chunks of the memory. Furthermore, a processor in the computer system may independently access the individual properties in the discontiguous chunks of memory.

18 Claims, 4 Drawing Sheets

DISCONTIGUOUS OBJECT ADDRESSING

TECHNICAL FIELD

Embodiments of the present invention relate to computer systems, and more specifically to discontiguous object addressing in a computer system.

BACKGROUND

Conventionally, objects in a computer system are logical entities stored in a memory, such as a cache memory, a hard drive, etc. Typically, each object has multiple properties. Nevertheless, the object is handled as a single unit, and is stored as a single unit in one or more contiguous chunks of memory. Because the properties of an object may span across a wide spectrum of information, not every property of the same object may be used as often as the other properties.

For instance, an exemplary conventional object is a data structure representing a bank account. The exemplary object may include the following properties: account number, account holder name(s), type of account (e.g., checking, saving, etc.), transaction history of the account, opening date of the account, etc. In some conventional applications, the opening date of the account is typically used less often than the account number of the account. In fact, according to one prior study, only approximately 20% of the properties of an object are involved in approximately 80% of the references to that object.

However, even though not each property of the object is used as frequently as other properties, one or more contiguous chunks of the memory are allocated to store the entire object because all properties of the object are managed as a single unit. This conventional approach is particularly wasteful for storing objects in the cache memory of the computer system because the capacity of the cache memory is generally more limited than other memories in the computer system.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
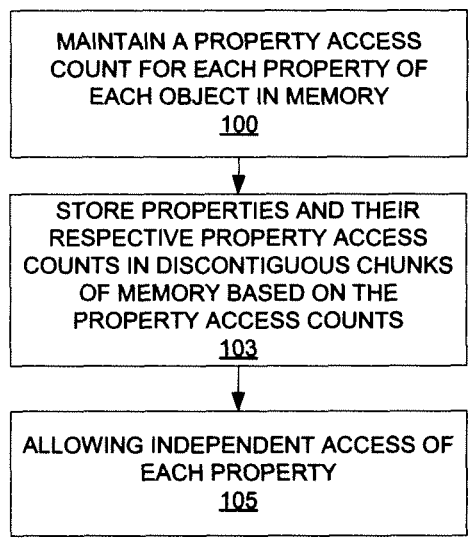
FIG. 1A illustrates a flow diagram of one embodiment of a method to manage objects with discontiguous addressing in a computer system.

Described herein are some embodiments of discontiguous object addressing. In some embodiments, a set of objects, each having one or more properties, are stored in a memory, which is divided into chunks. Specifically, the properties of at least one of the objects are stored in discontiguous chunks of the memory. A processor in the computer system may access the individual properties in the discontiguous chunks of memory independently. To further improve efficiency, the processor may track access data of the properties and may use the access data to manage the properties. More details of some embodiments of discontiguous object addressing are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates a flow diagram of one embodiment of a method to manage objects with discontiguous addressing in a computer system. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the computer system 200 illustrated in FIG. 2 in some embodiments.

Initially, processing logic maintains a property access count for each property of each object in a computer system separately in a memory of the computer system (processing block 100). An object as used herein broadly refers to a conceptual entity or a logical entity with a set of one or more properties. An object may contain data, which may include strings of characters, numbers, pointers to code, etc. The memory of the computer system may be a cache memory, a hard drive, etc. Then processing logic stores the properties of each object and their respective property access counts in one or more discontiguous chunks of the memory based on their respective property access counts (processing block 103). For example, properties with higher property access counts may be stored in a chunk of memory that allows faster access because these properties are more likely to be accessed, while properties with lower property access counts may be stored in a chunk of memory that requires longer access time because these properties are less likely to be accessed. Alternatively, properties of different objects that have high access counts may be stored in the same cacheline in a cache memory to shorten access time. Furthermore, processing logic allows the properties of each object to be accessed independently (processing block 105). In other words, a property of an object may be retrieved, read, or modified without retrieving, reading, or modifying other properties of the object.

Alternatively, instead of maintaining the access count, an access flag may be set once a property is accessed. The access flag may be reset upon garbage collection and locality optimization. This approach greatly simplifies tracking of access data of the properties. However, one should appreciate that the access data collected using the access flags provides less information than the property access counts, and thus, less optimization of the storage of the properties may be possible under this simplified approach.

Figure 1B:
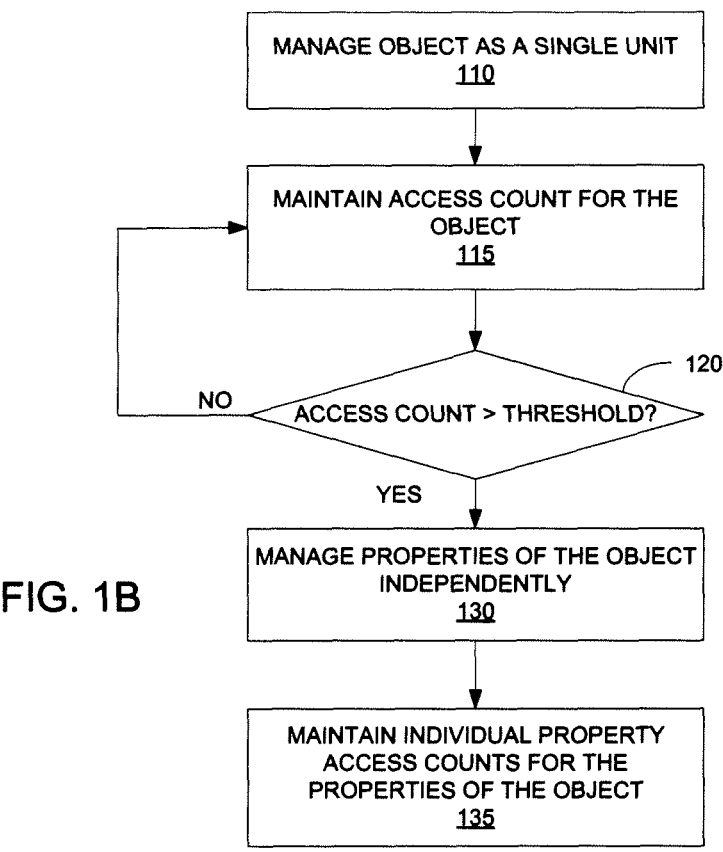
FIG. 1B illustrates a flow diagram of an alternate embodiment of a method to manage objects with discontiguous addressing in a computer system.

FIG. 1B illustrates a flow diagram of an alternate embodiment of a method to manage objects with discontiguous addressing in a computer system. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the computer system 200 illustrated in FIG. 2 in some embodiments.

Initially, processing logic manage each object in a computer system as a single unit (processing block 110). As discussed above, each object has a set of one or more properties. Processing logic maintains an access count for each object (processing block 115). For instance, each object is associated with its own access counter, and processing logic increments the access counter when the object is read. Processing logic increments the access counter again later when the object is modified. As such, the count in each access counter represents the number of times the corresponding object has been accessed.

In some embodiments, processing logic checks if the access count of the object has exceeded a predetermined threshold (processing block 120). The predetermined threshold may be a fixed value. Alternatively, the predetermined threshold may be an adjustable parameter. If the access count of the object has exceeded the predetermined threshold, then processing logic transitions to processing block 130. Otherwise, processing logic returns to processing block 115 to continue keeping track of the number of times the object has been accessed.

If the access count of the object exceeds the predetermined threshold, then processing logic may classify the object as a frequently accessed object in the computer system. Thus, to improve efficiency and to reduce access time, processing logic manages each property in the set of one or more properties of the object independently (processing block 130). Furthermore, processing logic maintains individual property access counts of the properties of the object (processing block 135).

Because the object may be managed as a single unit or the properties of the object may be managed separately, depending on how often the object is accessed, this approach is also referred to as a hybrid mode. As previously discussed, even though an object is frequently accessed, it is not necessary for all properties of the object to be about equally frequently accessed. For example, some properties of the object may be accessed once initially and is not accessed again later in many applications. By managing the properties of the object independently, processing logic may store the properties in discontiguous chunks of memory. For instance, some of the properties that are more frequently accessed than others may be stored in the same cacheline in a cache memory to shorten access time.

Note that the approach illustrated in FIG. 1A is simpler than the hybrid mode illustrated in FIG. 1B because there is no need to determine if an object should be managed as a single unit or the properties of the object should be managed independently. However, the approach illustrated in FIG. 1A may double or triple the amount of memory required to maintain the objects because of the extra access counts maintained for each property of each object.

Figure 2:
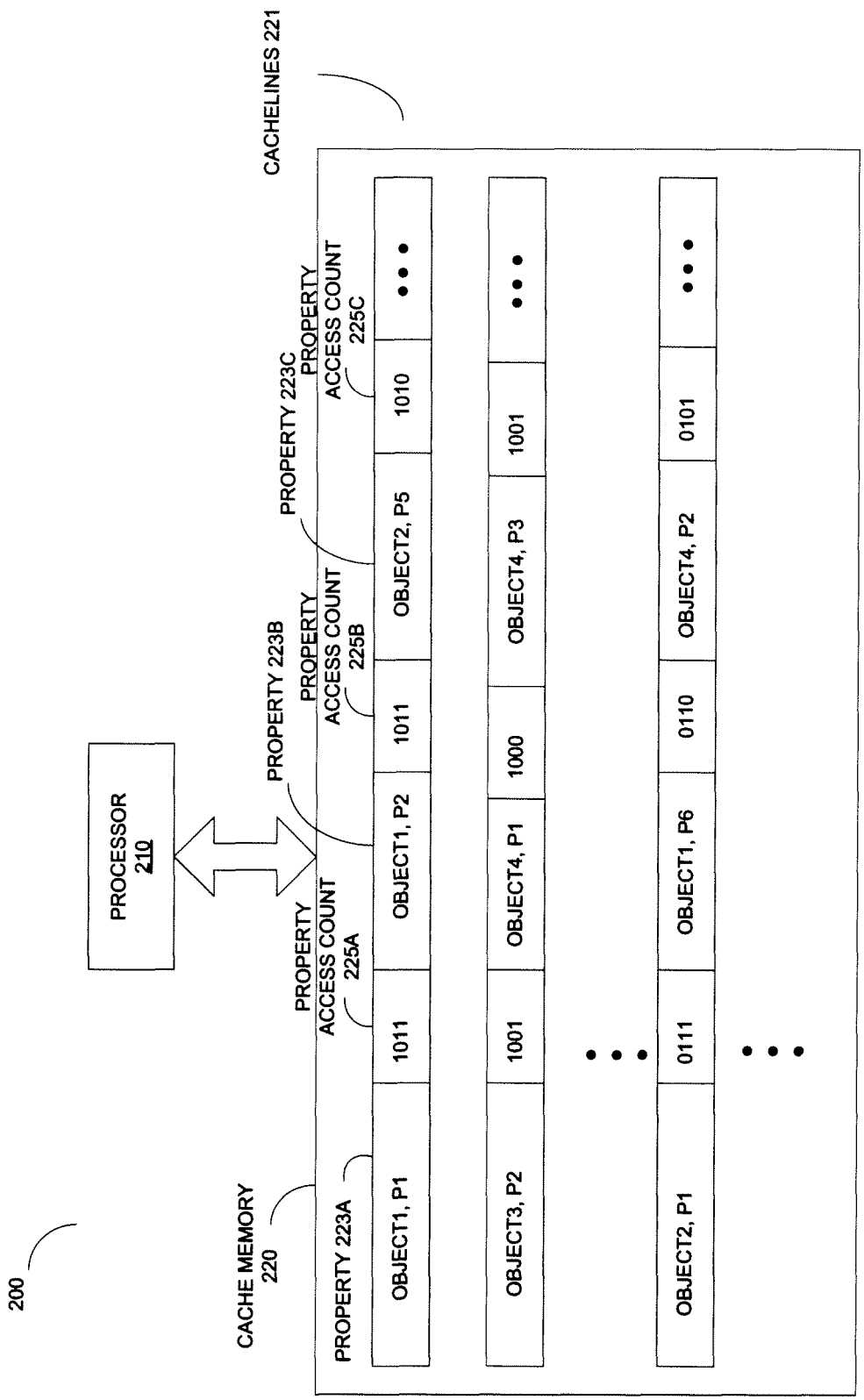
FIG. 2 illustrates a block diagram of one embodiment of a computer system.

FIG. 2 illustrates a block diagram of one embodiment of a computer system. The computer system 200 may be implemented in various machines, such as a server, a personal computer, a personal digital assistant, a cellular telephone, etc.

In some embodiments, the computer system 200 includes a processor 210 and a cache memory 220. The processor 210 may include one or more processing devices, single-core processors, multi-core processors, etc. Furthermore, the processor 210 is sometimes referred to as a central processing unit (CPU) in the computer system 200. In some embodiments, the processor 210 and the cache memory 220 reside on the same integrated circuit (IC) substrate. Alternatively, the processor 210 and the cache memory 220 reside on different IC substrates, but are, nevertheless, incorporated into the same semiconductor package. In another alternate embodiment, the processor 210 and the cache memory 220 reside on different IC substrates and are packaged separately. In general, the processor 210 can access the cache memory 220 faster than other memory or storage devices in the computer system 200 because the cache memory 220 is designed for fast access. To shorten access time, properties of objects that have high access counts are placed in the cache memory 220 because these properties are generally likely to be accessed again by the processor 210 soon.

In some embodiments, the cache memory 220 has a number of cachelines 221. The size of each of the cachelines 221 may vary in different embodiments (e.g., 8-byte, 16-byte, 512-byte, etc.). Each of the cachelines 221 stores a number of properties, which may or may not be associated with the same object. For example, referring to FIG. 2, in the first one of the cachelines 221, there are property 223A, property 223B, and property 223C, where properties 223A and 223B are associated with Object1, and property 223C is associated with a different object, Object2.

Each property in the cache memory 220 is stored with its own access count in an access count field. For example, property access count fields 225A-225C are associated with properties 223A-223C, respectively. The size of each property may vary, such as 2-byte, 4-byte, 8-byte, etc. The number of bits in each property access count field may also vary in different embodiments. In the example illustrated in FIG. 2, the property access count fields 225A-225C are 4-bit long. The property access count fields 225A-225C may be used by access counters for the properties 223A-223C to store the corresponding access counts of the properties 223A-223C. Each time the processor 210 accesses one of the properties 223A-223C, the count in the corresponding property access count field is incremented.

In some embodiments, the counts in the property access count fields 225A-225C are reset to zero upon garbage collection and locality optimization. Therefore, the counts in the property access count fields 225A-225C represent the number of times the respective properties 223A-223C have been accessed by the processor 210 since the last garbage collection and locality optimization.

Using the number of times the respective properties 223A-223C have been accessed by the processor 210 since the last garbage collection and locality optimization, the properties 223A-223C in the cache memory 220 can be re-arranged to be contiguous so that successive accesses to the properties 223A-223C are less likely to cause contention for the same cacheline. In some embodiments, the most frequently accessed properties are identified and placed close to each other in the cache memory 220. For instance, these properties may be arranged in the same cacheline or consecutive cachelines. Note that cachelines are generally only able to hold data from a small subset of the total addressable space. For example, a 16 M cache may only have 4 or 8 cachelines able to hold data residing at addresses that are evenly divisible by 1,048,576. If the frequently accessed properties are arranged in consecutive locations, it is much less likely that successive access to two different properties will cause contention that results in the earlier accessed property to be ejected from the cache. Also, since properties are typically small compared to cachelines, arranging frequently accessed properties into consecutive address locations normally packs multiple properties into a single cacheline, so that an access to a property that causes a cache miss is likely to cause other properties that will be accessed in the near future to be loaded into the cache at the same time.

Note that any or all of the components of the computer system 200 and associated hardware may be used in various embodiments of the present invention. However, it can be appreciated that other configurations of the computer system 200 may include more or fewer components than those discussed above. The processor 210 and the cache memory 220 are illustrative examples of components in the computer system 200. One should appreciate that other types of components and/or devices may be included in the computer system 200 in other embodiments. For example, the processor 210 may be further coupled to an input/output controller, a memory controller, and additional memory or storage devices in the computer system 200.

Figure 3:
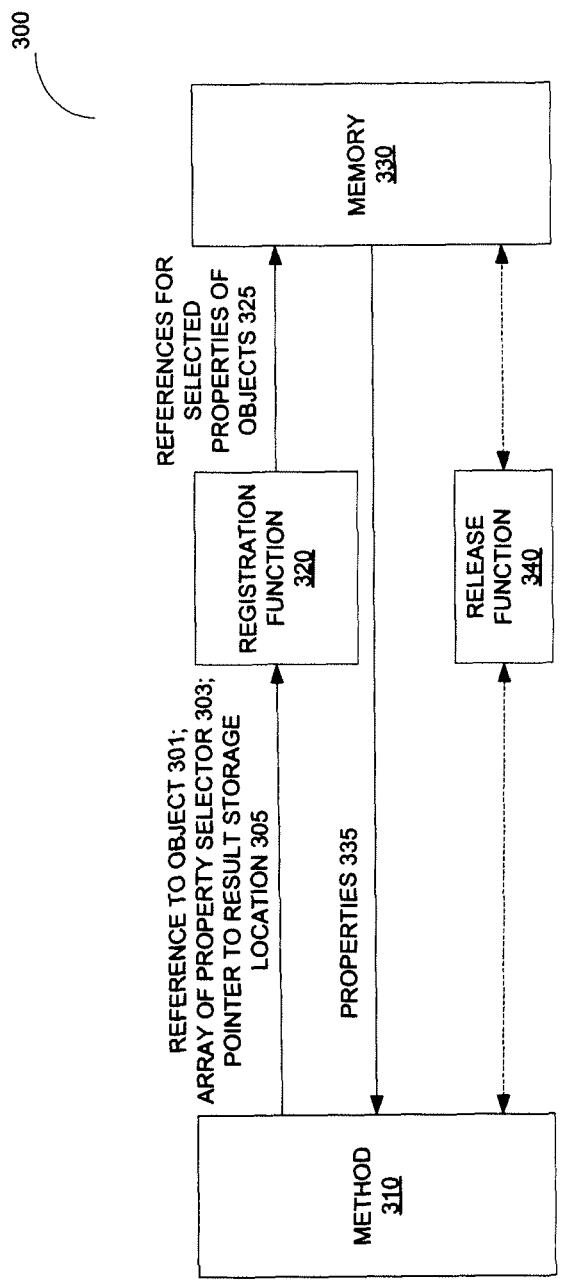
FIG. 3 illustrates a call diagram of one embodiment of an implementation of discontiguous object addressing.

FIG. 3 illustrates a call diagram of one embodiment of an implementation of discontiguous object addressing in a computer system. The computer system may be a server, a personal computer, a personal digital assistant, a cellular telephone, etc. One exemplary computer system usable to implement some embodiments of the current invention is shown in details in FIG. 4.

In some embodiments, the computer system 300 includes a method 310, a registration function 320, a memory 330, and a release function 340. When a caller (such as a user application) calls the method 310, the method 310 may attempt to reference one or more properties of an object. Thus, the method 310 calls the registration function 320 and sends a reference to the object 301, an array of property selectors 303, and a pointer to a result storage location 305 to the registration function 320. In some embodiments, the array of property selectors 303 may be statically created at compile time, and the array that holds returned data may be allocated from the stack frame of the calling method 310. The registration function 320 supplies the parameters usable by the method 310 to safely access the properties of the object that the method 310 requests to reference. Then the registration function 320 sends the references for the properties requested 325 to the memory 330 to access the properties. The memory 330 may include a cache memory, such as the cache memory 220 shown in FIG. 2. Details of how properties may be arranged and stored in the memory based on the property access counts have been discussed above with reference to FIG. 2.

After receiving the references for the properties requested 325, the memory 330 returns the properties 335 requested to the calling method 310. In some embodiments, the release function 340 may be called immediately before the method 310 returns to the caller, as indicated by the dashed arrows in FIG. 3.

If the access data is tracked separately, there may be different ways to proceed. In one embodiment, the registration function 320 populates a pointer to a property and a pointer to the corresponding property access counter for the property. In an alternate embodiment, the registration function 320 populates pointers to the properties, and initializes associated property access counters to zero, where the release function 340 and a garbage collection mechanism work together to maintain property access counts for the properties themselves. Note that the first approach may simplify the garbage collection process, but it is probably slower because updates to the property access counters would have to be synchronized. Synchronization of the property access counters may entail unnecessary cache write-throughs and bus stalls in a symmetric multi-processing (SMP) environment. As with the second alternative approach, updates to the access counter would require incrementing an integer value, which is a single cycle operation, assuming no cache misses. When the garbage collection or locality optimization thread begins, it would add and zero the values for each particular object it is managing. This may require synchronization, but some processors (such as many recent x86 microprocessors) provide atomic operations to make this simpler and faster. In this case, the release function 340 may simply add the property access counts to the respective existing property access counts for the properties.

Figure 4:
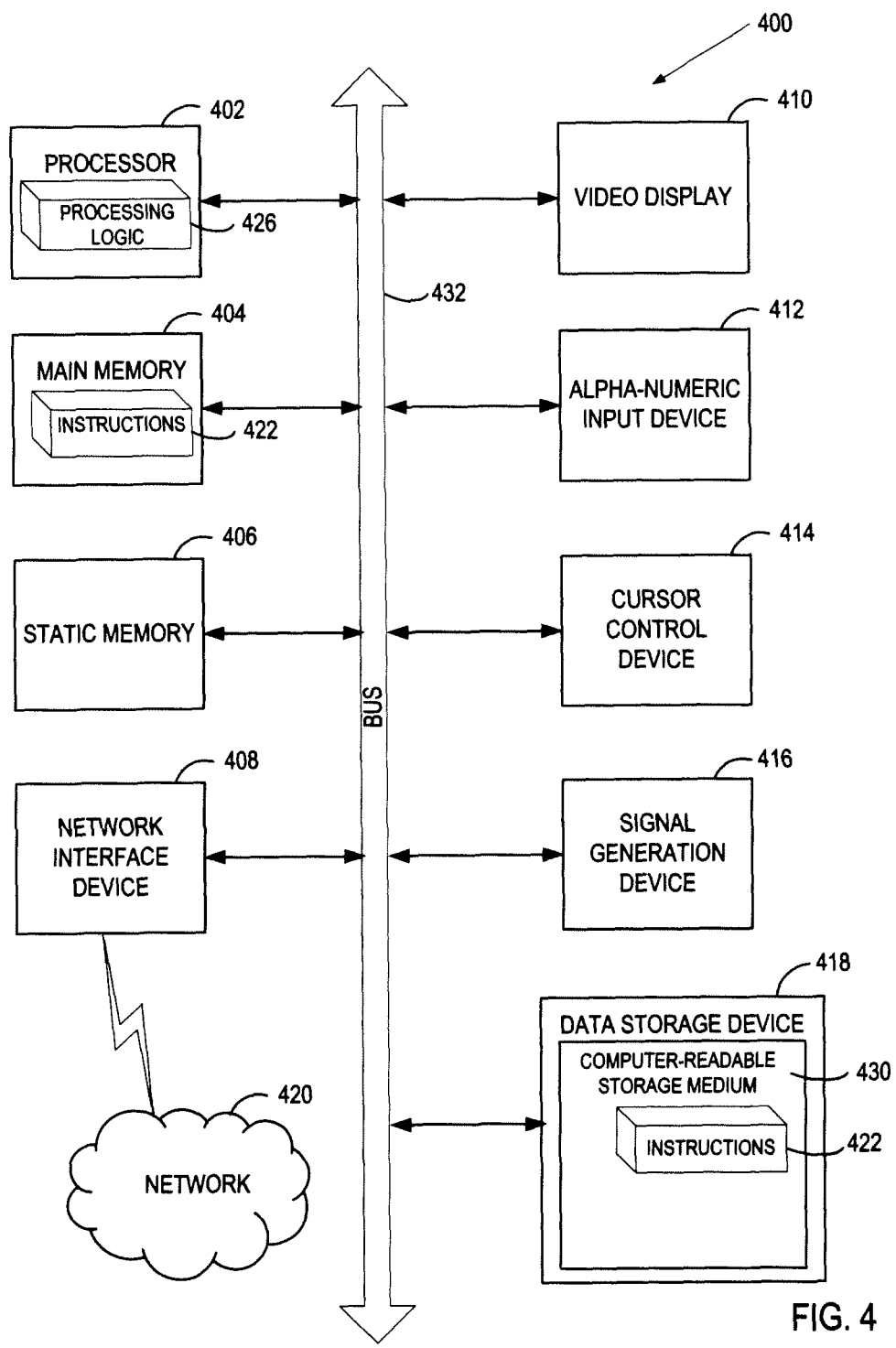
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of discontiguous object addressing have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   storing, by a processor, a plurality of objects in a memory of a computer system, said memory divided into a plurality of chunks, each of the plurality of objects having a set of properties, wherein said storing comprises storing the set of properties of at least one of the plurality of objects in discontiguous chunks of the plurality of chunks of memory, wherein the processor is allowed to independently access individual properties in the set of properties in the discontiguous chunks of the plurality of chunks of memory;
   managing, by the processor, each object of the plurality of objects as a single unit;
   maintaining, by the processor, an access count in an access counter for each object of the plurality of objects, the access count being indicative of a number of times each object of the plurality of objects has been accessed since last garbage collection;
   in response to the access count for an object of the plurality of objects not exceeding a threshold, continuing to maintain, by the processor, the access count in the access counter for the object; and
   in response to the access count for an object of the plurality of objects exceeding the threshold, transitioning to managing, by the processor, each property in the set of properties for the object independently and maintaining an individual property access count in a property access counter for each property in the set of properties for the object.

2. The method of claim 1, wherein managing each property in the set of properties for the object independently and maintaining an individual property access count in a property access counter for each property in the set of properties for the object further comprises selecting, by the processor, one of the discontiguous chunks to store a property based on the property access count.

3. The method of claim 1, wherein allowing the processor to independently access individual properties in the set of properties in the discontiguous chunks of the plurality of chunks of memory comprises:
   the processor receiving from a calling function a reference to one object of the plurality of objects, an array of property selectors, and a pointer to a location for storing result.

4. The method of claim 1, wherein allowing the processor to independently access individual properties in the set of properties in the discontiguous chunks of the plurality of chunks of memory comprises:
   the processor executing a registration function to supply parameters that a calling function uses to reference a property in the set of properties.

5. The method of claim 1, further comprising:
   the processor executing a registration function to populate a first pointer to each of the set of properties and a second pointer to a property access counter for a respective property.

6. The method of claim 1, further comprising:
the processor executing a registration function to populate a first set of pointers to the set of properties;
the processor initializing the property access counters associated with each property in the set of properties to zero; and
the processor maintaining property access counts of the set of properties in the property access counters using a release function and a garbage collection mechanism.

7. An apparatus comprising:
a memory to store a plurality of objects, said memory divided into a plurality of chunks, and each of the plurality of objects having a set of one or more properties, wherein the set of properties of at least one of the plurality of objects are stored in discontiguous chunks of the plurality of chunks of memory;
a processor coupled to the memory, to access individual properties in the set of properties in the discontiguous chunks of the plurality of chunks of memory independently;
an access counter for each object of the plurality of objects in the memory, wherein an access count in the access counter is indicative of a number of times each object has been accessed by the processor since lest garbage collection; and
a property access counter for each property in the set of properties for each object, wherein, in response to the access count for an object of the plurality of objects exceeding a threshold, the access count in the access counter for the object continues to be maintained, and wherein, in response to the access count for an object of the plurality of objects exceeding the threshold, the processor transitions to maintaining a property access count in each property access counter for the properties in the set of properties for the object with the access count exceeding the threshold.

8. The apparatus of claim 7, wherein the processor selects one of the discontiguous chunks to store each property of the set of properties for the object with an access count exceeding a threshold based on the property access count.

9. The apparatus of claim 7, further comprising:
a second memory to host a registration function, wherein the processor executes the registration function to receive a reference to one object of the plurality of objects, an array of property selectors, and a pointer to a location for storing results for the one object.

10. The apparatus of claim 7, further comprising:
a second memory to host a registration function, wherein the processor executes the registration function to supply parameters that a calling function uses to reference a property in the set of properties.

11. The apparatus of claim 7, further comprising:
a second memory to host a registration function, wherein the processor executes the registration function to populate a first pointer to each of the set of properties and a second pointer to an access counter for a respective property.

12. The apparatus of claim 7, further comprising:
a second memory to host a registration function and a release function, wherein the processor executes the registration function to populate a first set of pointers to the set of properties and to initialize a set of property access counters associated with the set of properties to zero; wherein the processor further executes the release function in operation with a garbage collection mechanism to maintain property access counts of the set of properties in the associated property access counters.

13. A non-transitory computer-readable storage medium embodying instructions that, when executed by a processor in a computer system, will cause the processor to perform operations comprising:
storing a plurality of objects in a memory of the computer system, said memory divided into a plurality of chunks, each of the plurality of objects having a set of properties, wherein said storing comprises storing the set of properties of at least one of the plurality of objects in discontiguous chunks of the plurality of chunks of memory, wherein the processor is allowed to independently access individual properties in the set of properties in the discontiguous chunks of the plurality of chunks of memory;
managing, by the processor, each object of the plurality of objects as a single unit;
maintaining, by the processor, an access count in an access counter for each object of the plurality of objects, the access count being indicative of a number of times each object of the plurality of objects has been accessed since last garbage collection;
in response to the access count for an object of the plurality of objects not exceeding a threshold, continuing to maintain, by the processor, the access count in the access counter for the object; and
in response to the access count for an object of the plurality of objects exceeding the threshold, transitioning to managing, by the processor, each property in the set of property access counter for each property in the set of properties for the object.

14. The computer-readable storage medium of claim 13, wherein managing each property in the set of properties for the object independently and maintaining an individual property access count in a property access counter for each property in the set of properties for the object further comprises:
selecting, by the processor, one of the discontiguous chunks to store a property based on the property access count.

15. The computer-readable storage medium of claim 13, wherein allowing the processor to independently access individual properties in the set of properties in the discontiguous chunks of the plurality of chunks of memory comprises:
the processor receiving from a calling function a reference to one object of the plurality of objects, an array of property selectors, and a pointer to a location for storing result.

16. The computer-readable storage medium of claim 13, wherein allowing the processor to independently access individual properties in the set of properties in the discontiguous chunks of the plurality of chunks of memory comprises:
the processor executing a registration function to supply parameters that a calling function uses to reference a property in the set of properties.

17. The computer-readable storage medium of claim 13, wherein the operations further comprise:
the processor executing a registration function to populate a first pointer to each of the set of properties and a second pointer to the property access counter for a respective property.

18. The computer-readable storage medium of claim 13, wherein the operations further comprise:
the processor executing a registration function to populate a first set of pointers to the set of properties;
the processor initializing a set of property access counters associated with the set of properties to zero; and
the processor maintaining access counts of the set of properties in the set of property access counters using a release function and a garbage collection mechanism.

* * * * *